(12) United States Patent
Ganzer et al.

(10) Patent No.: US 11,938,505 B2
(45) Date of Patent: Mar. 26, 2024

(54) MELT SYSTEM INCLUDING A MELT UNIT WITH A SIDE-LOADING HOPPER

(71) Applicant: NORDSON CORPORATION, Westlake, OH (US)

(72) Inventors: Charles P. Ganzer, Cumming, GA (US); Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 17/809,389

(22) Filed: Jun. 28, 2022

(65) Prior Publication Data

US 2022/0323986 A1    Oct. 13, 2022

Related U.S. Application Data

(63) Continuation of application No. 16/760,221, filed as application No. PCT/US2018/057715 on Oct. 26, 2018, now Pat. No. 11,389,822.

(60) Provisional application No. 62/579,349, filed on Oct. 31, 2017.

(51) Int. Cl.
| | |
|---|---|
| *B05B 11/10* | (2023.01) |
| *B05C 11/10* | (2006.01) |
| *D06N 3/00* | (2006.01) |

(52) U.S. Cl.
CPC ........ *B05C 11/1042* (2013.01); *D06N 3/0011* (2013.01)

(58) Field of Classification Search
CPC ..... B05C 11/1042; B05C 11/10; D06N 3/011; B29B 13/022; B29B 13/02
USPC ............. 222/146.2, 146.5, 330; 126/343.5 A
See application file for complete search history.

(56) References Cited

U.S. PATENT DOCUMENTS

| | | |
|---|---|---|
| 2,300,083 A | 10/1942 | Worthington |
| 3,377,466 A | 4/1968 | Paulsen |
| 3,395,694 A | 8/1968 | Ullman |
| 3,792,801 A | 2/1974 | Baker et al. |
| 3,876,105 A | 4/1975 | Kelling |
| 3,981,416 A | 9/1976 | Scholl |
| 4,308,447 A | 12/1981 | Noetzold et al. |
| 4,667,850 A | 5/1987 | Scholl et al. |

(Continued)

FOREIGN PATENT DOCUMENTS

| | | |
|---|---|---|
| CN | 104859067 A | 8/2015 |
| GB | 0549208 A | 11/1942 |

(Continued)

OTHER PUBLICATIONS

Extended European Search Report dated Jun. 9, 2023 for EP Application No. 22200920, 8 page(s).
U.S. Appl. No. 16/760,221, filed Apr. 29, 2020.

*Primary Examiner* — Vishal Pancholi
(74) *Attorney, Agent, or Firm* — BakerHostetler

(57) ABSTRACT

A melt system that includes a melt unit. The melt unit includes a reservoir and a melter. The melter is configured to expose solid adhesive to a temperature sufficient to form a molten adhesive, which is deposited into the reservoir. The melt unit includes a hopper disposed above the melter and for holding a supply of the solid adhesive. The hopper has an access door disposed on a wall of the hopper that is movable between a closed position where the hopper is closed and an open position where an internal chamber of the hopper is accessible to receive the solid adhesive. The hopper and the solid adhesive in the hopper are thermally isolated from the reservoir.

20 Claims, 10 Drawing Sheets

(56) References Cited

U.S. PATENT DOCUMENTS

| | | | |
|---|---|---|---|
| 5,657,904 | A | 8/1997 | Frates et al. |
| 6,175,101 | B1 | 1/2001 | Miller et al. |
| 9,169,088 | B2 | 10/2015 | Chau et al. |
| 9,304,028 | B2 | 4/2016 | Clark et al. |
| 2004/0155022 | A1 | 8/2004 | Velinsky et al. |
| 2017/0043964 | A1 | 2/2017 | Jeter |

FOREIGN PATENT DOCUMENTS

| | | | |
|---|---|---|---|
| JP | 55-030996 | A | 3/1980 |
| JP | 59-039519 | A | 3/1984 |
| JP | 04-114766 | A | 4/1992 |
| JP | 2014-084459 | A | 5/2014 |
| WO | 92/07696 | A1 | 5/1992 |

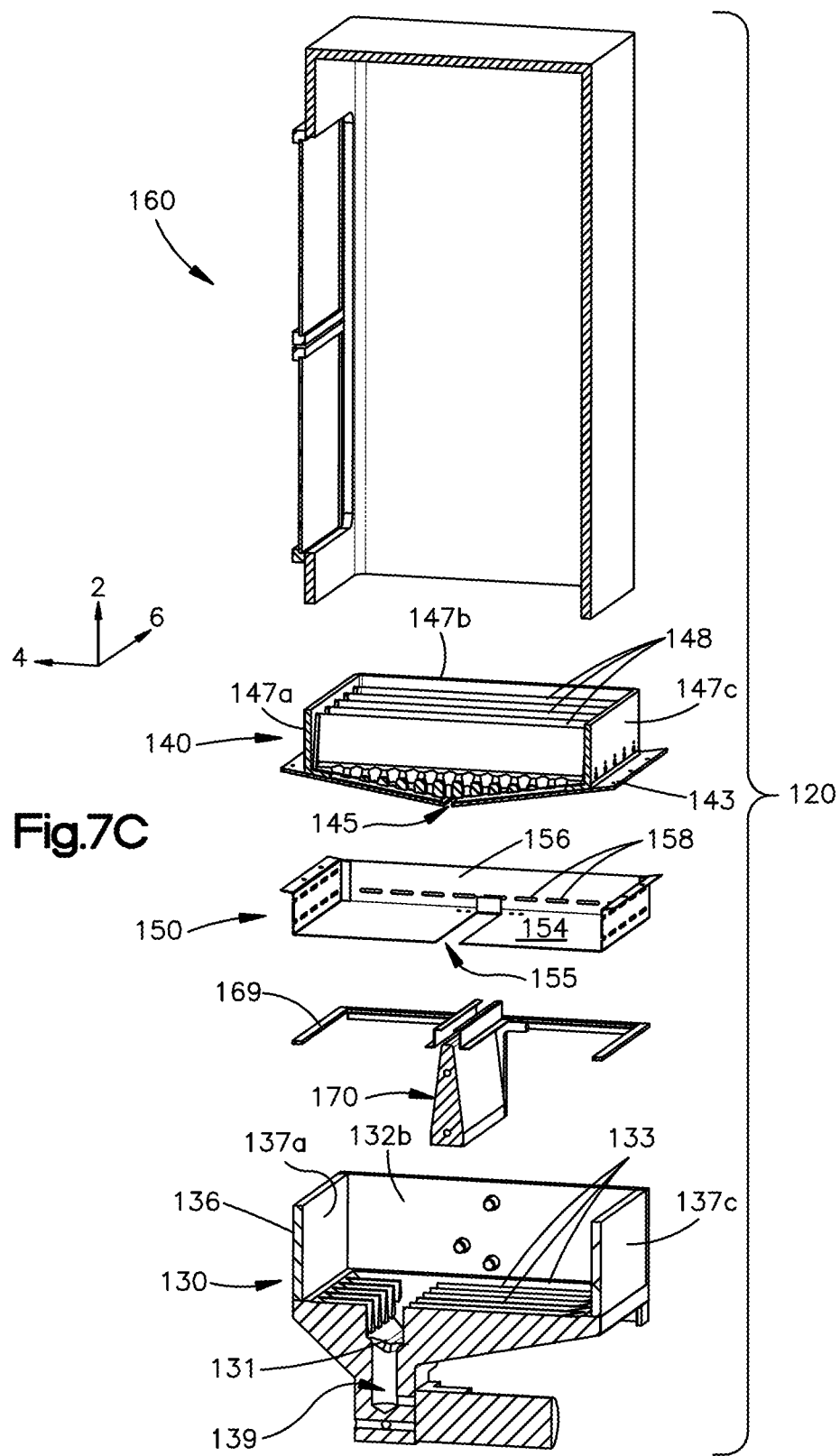

MELT SYSTEM INCLUDING A MELT UNIT WITH A SIDE-LOADING HOPPER

CROSS REFERENCE TO RELATED APPLICATIONS

This application is a continuation of U.S. patent application Ser. No. 16/760,221, filed Apr. 29, 2020, which is a U.S. National Stage Application of PCT International Patent App. No. PCT/US2018/057715, filed Oct. 26, 2018, which claims the benefit of U.S. Provisional Patent App. No. 62/579,349, filed Oct. 31, 2017, the entire disclosures of all of which are hereby incorporated by reference as if set forth in their entireties herein.

TECHNICAL FIELD

The present disclosure relates to a melt system including a melt unit with a thermal isolation region between the melt grid and a reservoir.

BACKGROUND

Conventional melt systems include a melt grid positioned below a hopper, a reservoir below the melt grid, a pump coupled to reservoir, and an applicator coupled to the pump. The melt grid exposes the solid polymer stored in the hopper to an elevated temperature, which converts the polymer into a molten liquid. The molten liquid is gravity fed to the reservoir where the pump transports the molten liquid to the applicator. The applicator deposits the molten liquid onto a substrate, such as a nonwoven or other material. The top of the hopper has a filling lid that can be opened to add solid polymer to the hopper as needed.

Conventional melt systems have several drawbacks related to when production is stopped and is later resumed. In operation, the molten polymer fills the reservoir and exits through the applicator as noted above. Over time, however, in conventional melt systems, the melt grid converts the polymer inside the hopper into a molten liquid. Here, the melt grid is effectively submerged within molten liquid. During a production stop, e.g., when a shift ends or a particular run is complete, the molten liquid inside the hopper (and melt grid) solidifies into a solid mass. To resume production, the temperature of the melt grid is elevated, which elevates the temperature of the solid polymer within the melt grid and inside the hopper. Eventually the solid polymer inside the hopper is converted to a molten liquid and intended throughput from the applicator is realized. Thus, the restarting process requires long start-up times that have a detrimental impact on the melt system efficiency.

Melt gain is another problem with conventional melt systems. In instances where the melt system is idling or product is stopped, melt grid temperature can be decreased to stop polymer melting. However, heat retained by the molten liquid in the reservoir contributes heat to the melt grid thereby increasing the temperature of the melt grid. The increased melt grid temperature re-initiates polymer melting, which, in turn, increases the level of molten polymer in the reservoir. The increase temperature in melting causes the level of molten polymer in the reservoir to rise. If melt gain is occurring when the melt system is shut down for an extended period, the molten polymer solidifies in the reservoir, the melt grid, and the hopper, creating a single mass of solid polymer. Restarting production takes longer because of the large solid mass must be converted back to molten polymer before molten liquid can be pumped to the applicator at the desired production rate.

Conventional melt systems also have drawbacks related to how the hoppers are used. First, typical melt systems do not provide a physical means, such as a window, to view the polymer level in the hopper without opening the filling lid. The filling lid must be kept closed at all times for safety reasons, except when filling the hopper. Thus, monitoring the solid polymer level in the hopper between loading instances is not practical. Polymer loading events are scheduled based on several factors, including the system throughput, amount of polymer added over a given period of time, and duration of machine production runs. In addition, current hopper designs present safety risks to operators when filling the hopper. When the filling lid is opened to add polymer, the operator is exposed to the molten liquid, which is a significant burn hazard. For certain applications, such as nonwovens, the polymer is loaded in the form of a bag or large sausage format. The size and weight of each bag (or sausage) can cause splashing of the molten liquid if thrown or dropped into the hopper, presenting an additional burn hazard. Depending on the polymer type, noxious vapors from outgassing may be encountered when the lid is opened. Furthermore, conventional melt systems have inherent space limitations due to the hopper design. Because the filling lid is located on top of the machine, existing hopper designs have an overall height limitation to ensure adequate operator access. In order to maximize hopper storage capacity in view of this height limitation, the overall machine footprint must be increased. This can be a problem if the melt system is being installed in an existing manufacturing facility where space is limited.

SUMMARY

There is a need for melt system that can efficiently melt molten polymer on demand, address safety risks, provide a thermal isolation region between reservoir holding molten polymer and the unmolten polymer in a hopper, increase storage capacity by directly storing only unmolten material in the hopper, and provide side loading access to the hopper. An embodiment of the present disclosure is a melt system configured to convert a solid polymer material into a molten material. The melt unit includes a reservoir, a melt grid disposed above the reservoir, a thermal isolation region between the reservoir and the melt grid, and a hopper for storing unmolten polymer and having an access door and a visualization window.

The melt grid is configured to expose the solid polymer material to a temperature sufficient to form a molten polymer material and to deposit the molten material into the reservoir. The thermal isolation region includes an air gap in the upper portion of the reservoir below the melt grid and/or an isolation chamber. The thermal isolation region thermally isolates the hopper from molten polymer in the reservoir when molten polymer is in the reservoir. Thermal isolation minimizes heat transfer from the molten liquid to the heated melt grid, which reduces melt gain. The hopper has a lower end, an upper end opposite the lower end, and a wall that extends from the lower end to the upper end. The lower end can be proximate to and open to the melt grid. The upper end and the wall defines an internal chamber that holds the supply of the solid polymer material. The hopper includes an access door disposed preferably on the wall including a visualization window. However, the access door may be on the upper end and the visualization window may be separate from the access door. The access door is movable between a closed position where the one hopper is closed and an open position where the internal chamber is accessible to receive the solid polymer material.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown.

FIG. 7C is an exploded perspective cross-sectional view the melt unit shown in FIG. 7A.

DETAILED DESCRIPTION OF ILLUSTRATIVE EMBODIMENTS

Figure 1:
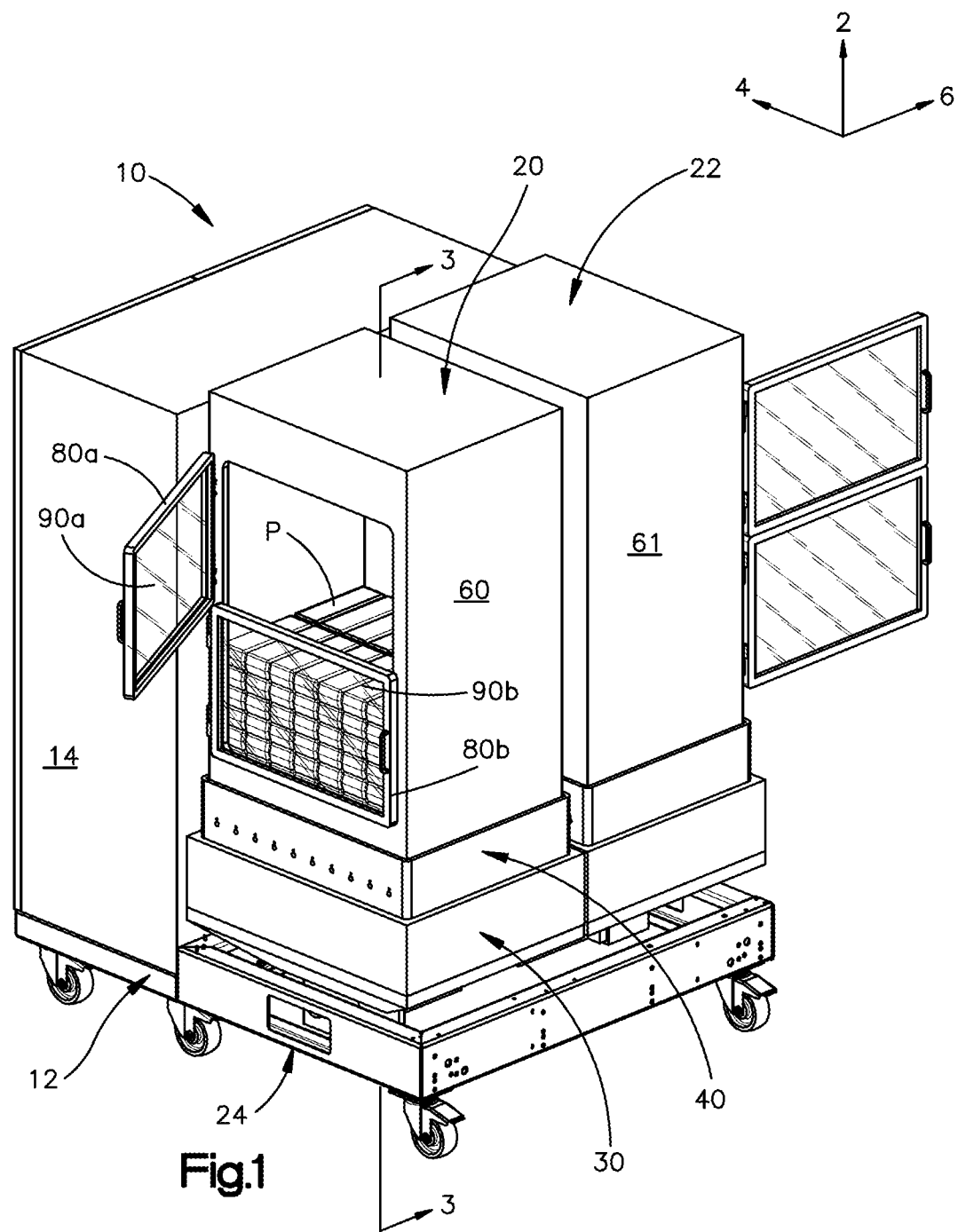
FIG. 1 is a perspective view of a melt system according to an embodiment of the present disclosure.
Figure 2:
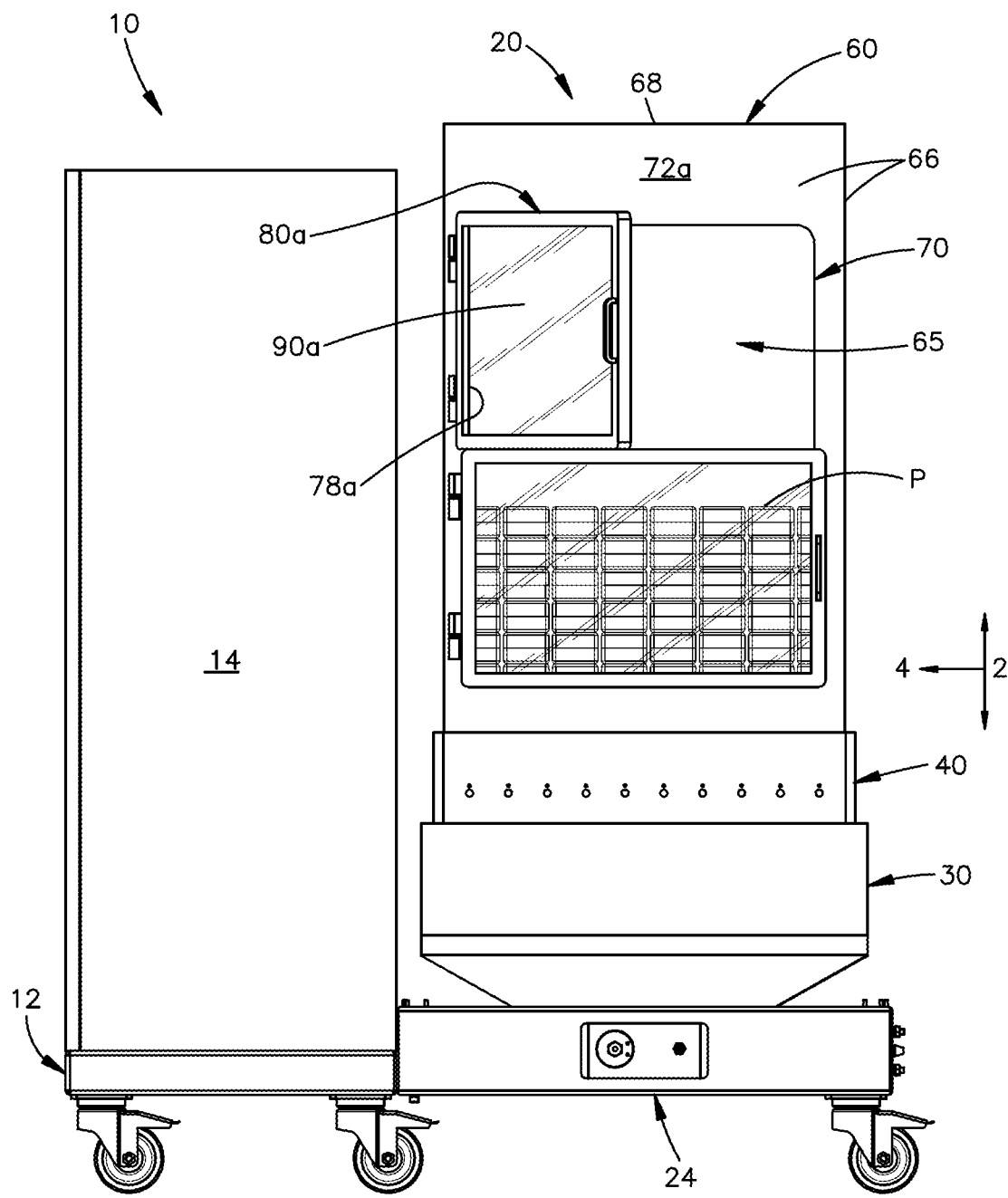
FIG. 2 is a side elevation view of the melt system shown in FIG. 1.

Turning to FIGS. 1 and 2, an embodiment of the present disclosure includes a melting system 10 configured to melt and deliver a liquid, such as a polymer material P, or more specifically a thermoplastic material, downstream to dispensing equipment (not shown). The dispensing equipment can be used to apply the molten polymer material onto a substrate. The substrate can be a nonwoven material used in hygiene or other applications such as paper and paperboard packaging or other product assembly applications involving adhesives, or onto materials where application of a polymer material, such as an adhesive, is needed. The polymer material P can be a pressure sensitive adhesive. However, it should be appreciated that melt system 10 can be adapted to process other polymer materials.

As shown in FIGS. 1 and 2, the melt system 10 generally includes a base frame 12 mounted on wheels (not numbered), a control unit 14 supported by one side of the base frame 12, and at least one melt unit. In accordance with the illustrated embodiment, the melt system 10 includes a plurality of melt units 20, 22 supported by the other side of the base frame 12. The control unit 14 includes a cabinet that houses controllers, displays, user interfaces, etc., an operator can use to control operation of the melt system. The control unit 15 is connected to the melt unit 20, 22 via wired connectors 16.

In accordance with the illustrated embodiment, the melt system 10 includes a first melt unit 20 and a second melt unit 22. As illustrated, the first and second melt units 20 and 22 are substantially similar to each other. For instance, the first melt unit 20 includes a first hopper 60 and the second melt unit 22 includes a second hopper 61 that is similar to the first hopper 60. Accordingly, only a single melt unit 20 will be described below. It should be appreciated, however, that there may differences between the first melt unit 20 and the second melt unit 22. Specifically, the configuration of the access doors 80a, 80b and locations of the visualization windows 90a, 90b between the first and second hoppers 60 and 61 can differ. For example, the first hopper 60 may have at least one visualization window that is separate from the access door while the second hopper 61 has at least one access door that include a visualization window. Furthermore, the melt system 10 may include a single melt unit or it may include more than two melt units. The inventive principles as described herein can be scaled up or down in size depending on application requirements, such as for nonwovens or packaging applications.

Continuing with FIGS. 1 and 2, the melt unit 20 is supported by the base frame 12 and the underlying surface and extends upwardly along a vertical direction 2. The melt unit 20 and control unit 14, and thus the base frame 12, define the overall "footprint" of the melt system 10. As illustrated, the footprint is substantially rectilinear and extends along a first lateral direction 4 and a second lateral direction 6 that are perpendicular to each other and to the vertical direction 2. The vertical direction 2, the first lateral direction 4, and the second lateral direction 6 are directional components used to describe spatial relationship of components and subcomponents of the melt system 10 described below.

Figure 3:
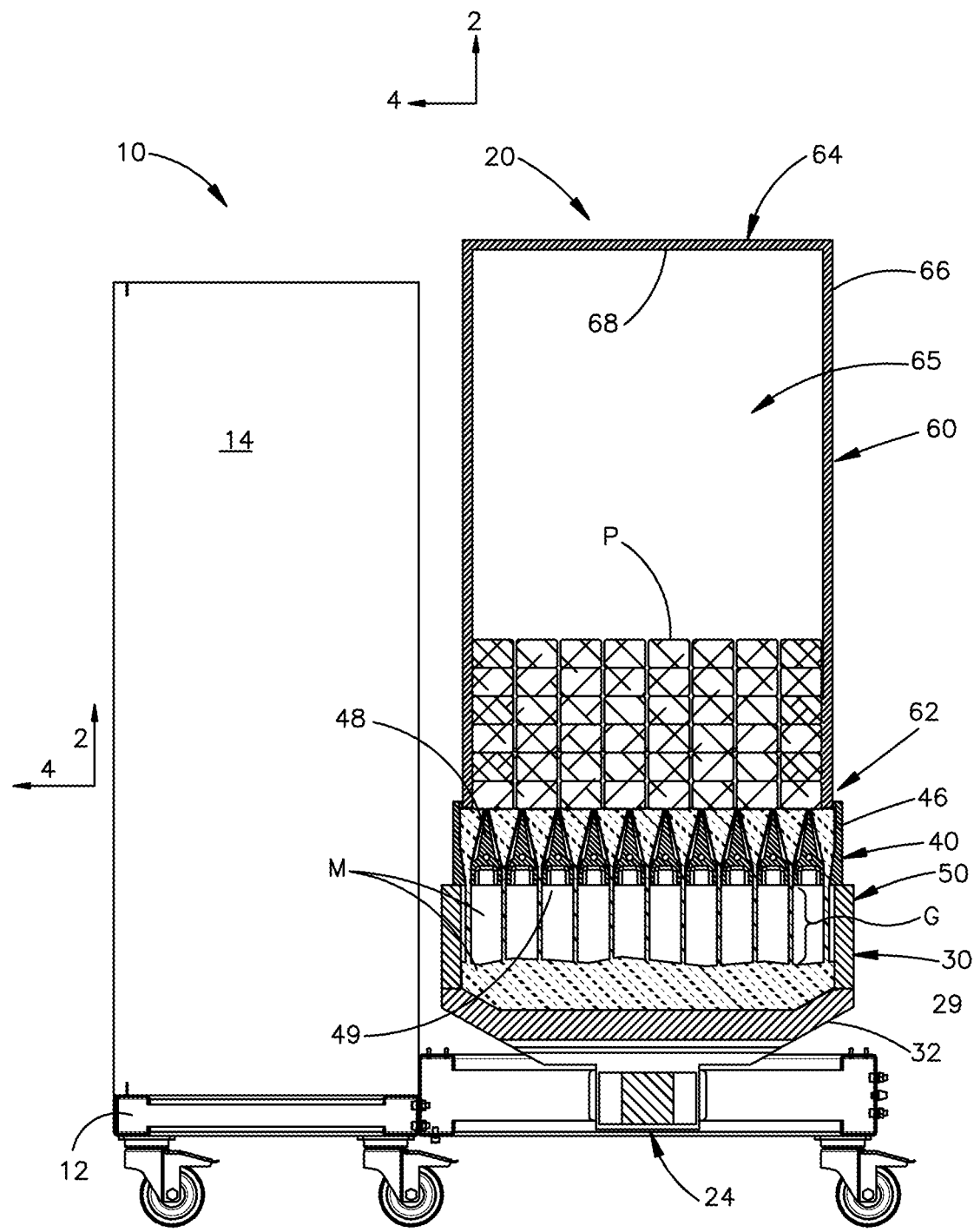
FIG. 3 is a cross-sectional view of a portion of the melt system taken along line 3-3 in FIG. 1.
Figure 8:
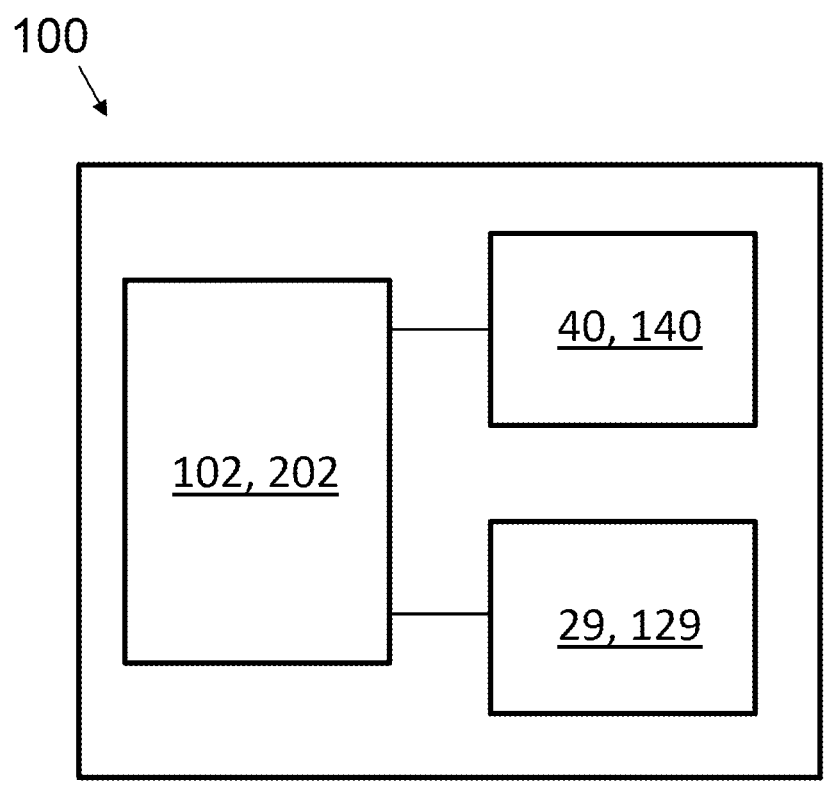
FIG. 8 is a schematic diagram of a control system for the melt system described herein.

Continuing with FIGS. 1-3, the melt unit 20 includes a pump assembly 24 proximate the base frame 12, a reservoir 30 coupled to the pump assembly 24, one or more sensors 29 positioned in the reservoir 30, a melt grid 40 above the reservoir 30, and a hopper 60 mounted above the melt grid 40. The melt unit also includes a thermal isolation region 50 disposed between the reservoir 30 and the hopper 60. The melt system includes a control system 100 that controls operations of the melt unit 20, as shown in FIG. 8. The control system 100 includes a controller 102 coupled to the one or more sensors 29 and the melt grid 40. The control system 100 is used to control flow of molten polymer from the melt grid 40 and into the reservoir 30 as explained below.

Referring to FIGS. 1-3, the thermal isolation region 50 creates a barrier between molten liquid M, typically a polymer material, in the reservoir 30 and the solid polymer material P in the hopper 60. The thermal isolation region 50 helps maintain the temperature in the hopper below the melting temperature of the polymer material P. For example, the thermal isolation region 50 helps maintain the solid polymer material in the hopper 60 at a first temperature that is lower than a second temperature of the molten polymer material in the reservoir 30 by creating a thermal barrier that minimizes heat transfer from the reservoir 30 through the melt grid 40 to the hopper. As shown in FIG. 3, the thermal isolation region 50 comprises the gap G between the melt grid 40 and the molten liquid M in reservoir. The thermal isolation region 50 can be any space or structure that creates a thermal barrier to minimize or even eliminate thermal migration from the molten polymer in the reservoir to the solid polymer P in the hopper. For instance, the thermal isolation region 50 may be an upper portion of the reservoir 30, as shown in FIG. 3). In another embodiment, the thermal isolation region may comprise a separate component positioned between the reservoir 30 and the melt grid 40, for example, a thermal isolation chamber 150 in FIG. 6). In some instances, there may be a thermal isolation region 50 and/or separate component positioned between the hopper 60 and the melt grid 40 (not shown).

Figure 4:
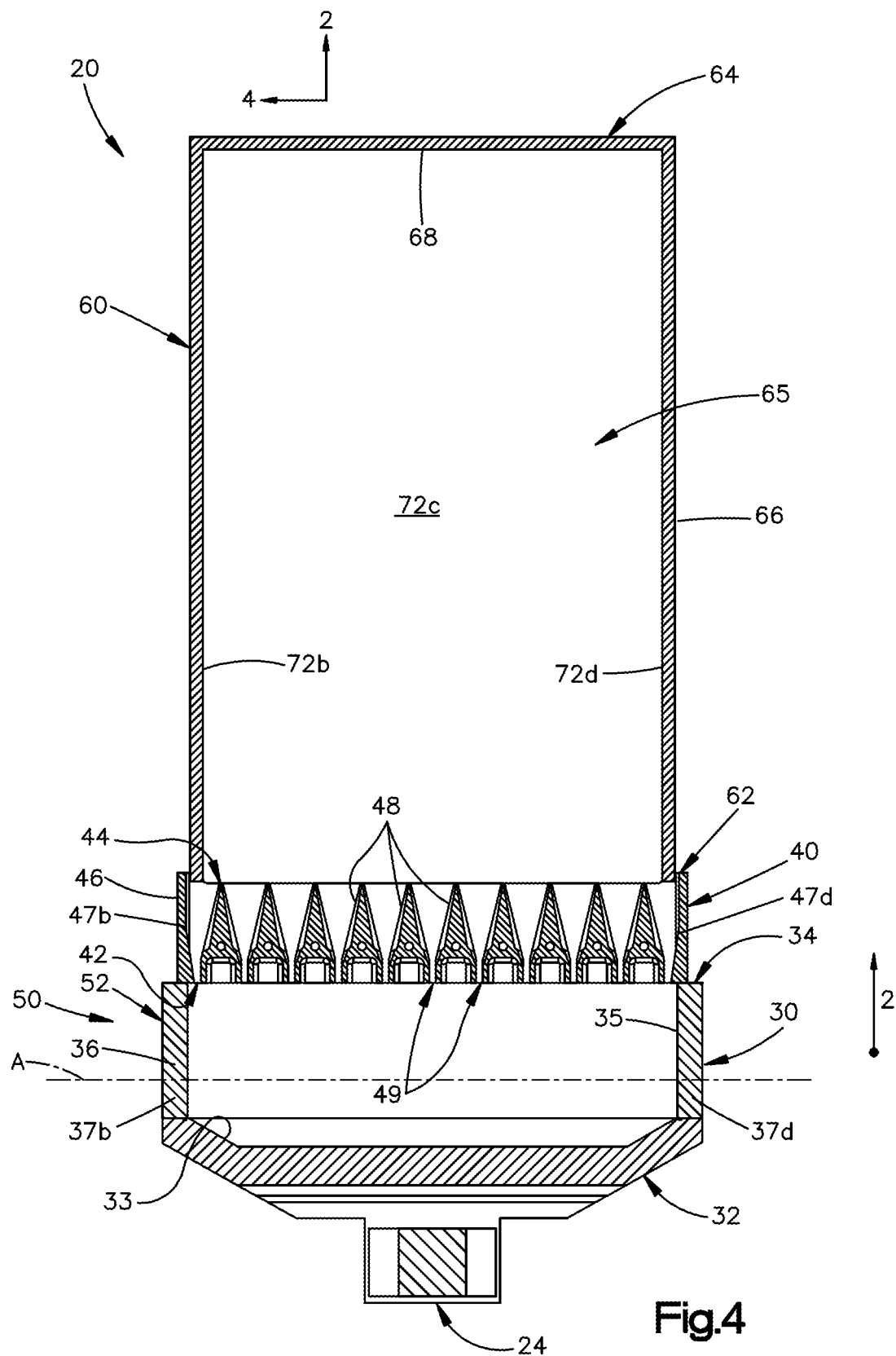
FIG. 4 is a cross-sectional view of the melt unit shown in FIG. 1 with the other components of the melt system removed for clarity.

Turning to FIGS. 3 and 4, the reservoir 30 captures the molten material M exiting the melt grid 40. The reservoir 30 includes a base 32, a top 34 opposite the base 32 along a vertical direction 2, and an outer wall 36. The outer wall 36 includes four sides 37a, 37b, 37c and 37d (37a not shown). The outer wall 36 defines an inner surface 35 along which the sensor 29 is positioned. The base 32 has an inner surface 33, a portion of which is angled with respect to the vertical direction 2. The inner surface 33 guides molten material M into a portal (not numbered) that feeds into pump assembly 24 below the reservoir 30. The amount of molten polymer M that accumulates in the reservoir 30 is based, in part, on a) the throughput of polymer through the melt grid 40, b) the output of molten polymer from the reservoir 30, and c) the height of the outer wall 36.

In accordance with the illustrated embodiment, the thermal isolation region 50 is disposed below the melt grid 40. As shown in FIGS. 3 and 4, the outer wall 36 has a height that is sufficient to facilitate formation of an air gap G between the melt grid 40 and a pool of molten material that accumulates at the base 32 of the reservoir 30 during operation. As shown, the thermal isolation region 50 comprises, at least in part, the air gap G aligned with an upper portion 52 of the reservoir 30. In this regard, it can be said the thermal isolation region 50 includes the upper portion 52 of the reservoir 30. The upper portion 52 of the outer wall 36 extends from the top 34 of the reservoir to an axis A that extends through the outer wall 36 of the reservoir 30. The axis A is shown at a location above the base 32 of the reservoir. The extent of gap G is selected to separate the bottom of the melt grid 40 from the heated, molten polymer M in the reservoir 30. The separation creates a thermal barrier that can inhibit or minimize heat transfer from the molten liquid M to the melt grid 40.

Continuing with FIGS. 3 and 4, the melt grid 40 is configured to turn the solid polymer material P in the hopper 60 into the molten polymer material M. The melt grid includes a bottom 42 and a top 44 spaced from the bottom 42 along the vertical direction 2. The bottom 42 of the melt grid 40 is mounted to the top 34 of the reservoir 30. The hopper 60 is coupled to the top 44 of the melt grid 40. The melt grid 40 has an outer wall 46 that includes four sides 47a, 47b, 47c and 47d (only 47b and 47d are shown FIG. 4). The melt grid 40 may also include a plurality of parallel and spaced apart melting rails 48. The melting rails 48 extend across the melt grid 40 along the second lateral direction 6 (into the sheet in FIG. 3). The melting rails 48 define passages 49 that extend between adjacent melting rails 48. The melting rails 48 can have different orientations as needed. In some instances, cross-bars (not shown) may connect adjacent melting rails. Each melting rail 48 includes one or more heater elements that elevate the temperature of the melting rails 48 to the desired temperature for processing the polymer material P. The heating elements are connected to the controller 102 via the wired connector 16. In addition, the melt grid 40 may include guide members 43 coupled to the bottom the melt grid 40. The guide members 43 guide polymer from exiting the from between the melting rails 48 into the molten polymer M. The guide members 43 may reduce formation of air bubbles as the polymer falls from the bottom of the melt grid 40 into the reservoir 30.

The melt grid is designed for efficient heating to the desired operating temperature from a cooled state. In one example, the melt grid has a mass selected to provide a watt density of 8-10 w/in$^3$. Such a melt grid may take about 20 minutes to reach its desired operating temperature. In another example, the melt grid has a mass selected to increase watt density and utilizes thin film heaters. In this example, the melt grid has a watt density of 60-70 w/in$^3$. Such a melt grid will take about 3-6 minutes to reach its desired operating temperature. In contrast, conventional melt grids use heavy castings and cartridge heaters and have a watt density of 4-5 w/in$^3$. Conventional melt grids will take thirty or more minutes to reach the desired operating temperature. Accordingly, the melt grids as described herein may be considered low mass melt grids and have a watt density is greater than 6-8 w/in$^3$ and could be as high as 60-70 w/in$^3$. Such low mass melt grids heat up and cool down faster compared to the conventional melt grids. Faster heat-up and cooling increases operational efficiency by reducing the amount of time the melt unit is not generating molten polymer waiting for the system to reach its desired operational temperatures.

Referring to FIGS. 3-4, the hopper 60 is configured to hold polymer material P. As illustrated, the hopper 60 has a lower end 62, an upper end 64 opposite the lower end 62 along the vertical direction 2, and a wall 66 that extends from the lower end 62 to the upper end 64. The upper end 64 includes an upper cover 68 that closes the upper end 64 of the hopper 60. The wall 66 extends around an entirety of the hopper 60 such that the wall 66 and the upper cover 68 define an internal chamber 65 that holds the polymer material P. The lower end 62 is substantially open to the melt grid 40. As shown in FIGS. 3-4, the lower end 62 is open to the melting rails 48 and passages 49 of the melt grid 40. The upper cover 68 closes the top of the hopper and permits an increase in hopper height compared to conventional hoppers used in typical melt systems. Because in the preferred embodiment, the hopper 60 is side-loading, as will be described below, the upper end 64 may be enclosed. This permits the hopper 60 to be designed and installed in such a way that the upper end 64 extends closer to the ceiling than what would be possible with a typical top-loading hopper. This results in increased polymer storage capacity over typical melt systems.

In accordance with the illustrated embodiment, the wall 66 includes a plurality of sides 72a-72d. As best shown in FIGS. 2 and 4, the wall 66 includes a first side 72a, a second side 72b that intersects the first side 72a, a third side 72c that intersects the second side 72b and that is opposite the first side 72a, and a fourth side 72d that intersects the first side 72a (FIG. 2) and the third side 72c. The fourth side 72d is opposite the second side 72b. The first side 72a can be considered the front side or front of the hopper 60 and the third side 72c can be considered the back or back side of the hopper 60. A "side" of the hopper 60 can also be referred to as a side wall in certain embodiments. As shown, the upper cover 68 intersects all four sides 72a-72b. The four sides 72a-72d are arranged to form a rectilinear cross-sectional shaped hopper. Although a rectilinear cross-sectional shaped hopper 60 is illustrated, the hopper 60 can have other cross-sectional shapes. For example, in accordance with an alternative embodiment, the hopper 60 has a tubular shape. In such an embodiment, the hopper 60 includes a wall 66 that forms a tubular shaped body. In such an embodiment, the hopper 60 includes a single curved wall.

As shown in FIGS. 1 and 2, with the preferred embodiment, the hopper 60 is configured for side-access. The hopper 60 includes one or more openings 70 and one or more access doors 80a, 80b that are movable between a closed position and an open position to provide access to the internal chamber 65. The hopper 60 may also include one or more visualization windows 90a, 90b.

The side access doors 80a, 80b permit an operator to load polymer material P from the side of the hopper 60. In accordance with the illustrated embodiment shown in FIGS. 1 and 2, the hopper 60 includes a first access door 80a and a second access door 80b that are positioned with respect to each other along the vertical direction 2 and operable to cover the opening 70. When the access doors 80a, 80b are in the closed position, the hopper 60 is closed. When the access doors 80a, 80b are in the open position the internal chamber 65 is accessible to receive the polymer material P from a location external to the hopper 60. The operator opens the access door 80a or 80b and loads polymer material P into the internal chamber 65 when the supply falls below a threshold amount. The first and second access doors 80a, 80b therefore allow side loading of polymer material P. When loading polymer material P into the side of the hopper 60, both access doors 80a, 80b may be opened and a first stack of polymer material P created in the hopper 60. Then, the second access door 80b can be closed to stabilize the pile of polymer material P, and loading of the hopper 60 can recommence with only the first access door 80a open until the hopper 60 is full. As best shown in FIGS. 1 and 2, first access door 80a and the second access door 80b each pivot between the closed position and the open position. In an alternative embodiment, however, the access doors 80a, 80b are slidable between the closed position and the open position. In still other embodiments, the melt grid may be used with hoppers that are top loading and include a movable lid at the top of the hopper 60.

The visualization windows 90a, 90b includes a transparent panel that permits the operator to see inside the hopper 60 and observe the level of polymer material P in the hopper 60. As illustrated, the first access door 80a and second access door 80b includes a corresponding first visualization window 90a and a second visualization window 90b. In alternative embodiments, however, the access doors 80a, 80b and visualization windows 90a, 90b may be independent of each other. For example, the visualization window 90a, 90b can be disposed along one of walls 66. If the level of polymer material P falls below a threshold, the hopper 60 can be reloaded with polymer material P as needed using the side access doors 80a, 80b. Reloading occurs without having to remove an upper cover as is required for conventional hopper designs. The side-loading hopper as described herein removes height limitations typical in top-loading hoppers because use of the top filling lid is eliminated. Storage capacity is increased without increasing machine footprint. Furthermore, the melt system 10 maintains solid polymer material in the hopper during operation, which reduces safety risks over top-loading designs because there is no longer a molten pool in the hopper and the associated burn risks and noxious fumes. Furthermore, the visualization windows 90a, 90b permit observation of the polymer level at any time during operation of the melt system 10 without having to open the hopper 60.

The melt units as described herein includes at least one side-loading hopper, which allows an increase in height over conventional hoppers by eliminating the height limitation driven by the need for the operator to reach over the top of the hopper to reach the filling lid. This enables increased holding capacity in hopper, by as much as 20% to 30% or more, over conventional hoppers used in typical melting systems. Embodiments of the present disclosure allow the operator to load material to a higher level without being limited by lid and hopper ergonomics. The visualization windows, when included in the hopper, provide easy visibility of the polymer level at all times from a distance in real-time, which neither is included in nor is it easily achieved in conventional melt units. Furthermore, because the side-loading functionality, during the filling process the operator is positioned so as to be effectively removed from direct exposure to fumes that might be emerging from the melt zone since he is not directly above the melt zone.

The hopper 60 has described and shown in figures disposed on top of the melt grid 40 that is separated from the molten material in the reservoir 30 by the thermal isolation region 50 (or the air gap G). The thermal isolation region 50 inhibits heat transfer from the molten liquid to the solid polymer stored in the hopper 60. However, the hopper 60 as described herein can be used in melt systems with different types of melt grids and reservoir configurations than what is shown and described above. Rather, the hopper 60 can be used in any type of melt systems where molten material M and the solid polymer stored in the hopper 60 are thermally isolated with respect to each other. In other words, embodiments of the present disclosure include a melt system that includes a hopper that is thermally isolated from the reservoir 30 that contains molten liquid.

Turning to FIG. 8, the control system 100 is used to control flow of molten polymer from the melt grid 40 and into the reservoir 30 as explained below.

Referring to FIG. 3, in operation, the hopper 60 holds a supply of solid polymer material P on top of the melt grid 40. The melt grid 40 has heating elements that expose the solid polymer material P positioned above the melt grid 40 to a temperature sufficient to form a molten polymer material M. The molten polymer material M flows through the melt grid 40 and is deposited into the reservoir 30 and through one or more passageways(not shown) to the pump assembly 24. The control system 100 implements a closed-loop control mechanism to maintain adequate level of molten polymer M in the reservoir 30. The controller 102 receives a signal from the melt grid 40 with data concerning the melt grid temperature. As polymer flows into the reservoir 30, the sensor 29 determines the level of molten polymer in the reservoir. The sensor 29 transmits a signal to the controller 102. The controller 102 determines if the level of molten polymer M is at or higher than a threshold level. If the level of molten polymer M is at or higher than the threshold level, the controller 102 causes the temperature of the melt grid 40 to decrease by a determined amount. The lower melt grid temperature decreases the rate of molten polymer M flowing into the reservoir 30. This results in the level of molten polymer M in the reservoir decreasing as molten polymer M is pumped to the applicator (not shown). The sensor 29 detects when the level of molten polymer M falls below the threshold level and transmits the signal to the controller 102. The controller 102 causes the temperature of the melt grid 40 to increase, thereby increasing the amount of molten polymer P flowing into the reservoir 30. The feedback loop between sensor data and temperature adjustment based on the sensor data controls the level of molten polymer M in the reservoir 30 to maintain an air gap below the melt grid 40. During the control process described above, the pump assembly 24, however, is used to continuously pump the molten material M from the reservoir 30 through hoses (not shown) to an applicator (not shown), which ejects the molten material M onto the desired substrate. As molten material M is ejected, the supply of polymer material P in the hopper 60 is depleted. The supply of polymer material P may be observed through the visualization windows 90a, 90b (FIG. 2), when present, as described above.

Another embodiment of a melt system is illustrated in FIGS. 5-7C. The melt system 110 illustrated in FIGS. 5-7C is similar to the melt system 10 shown in FIGS. 1-5. The melt system 10 and melt system 110 include common features and have similar modes of operation.

Figure 5:
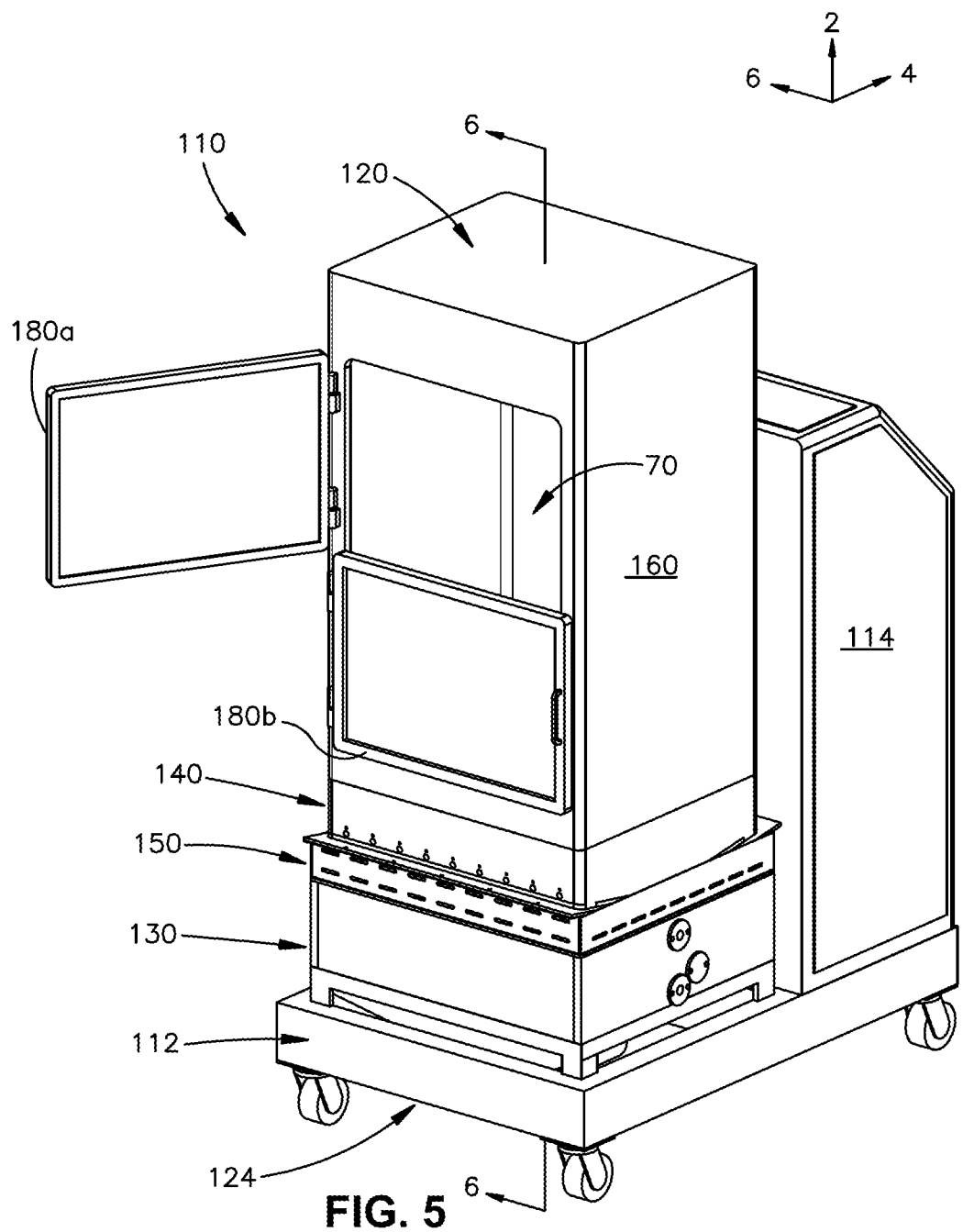
FIG. 5 is a perspective view of a melt system according to another embodiment of the present disclosure.
Figure 6:
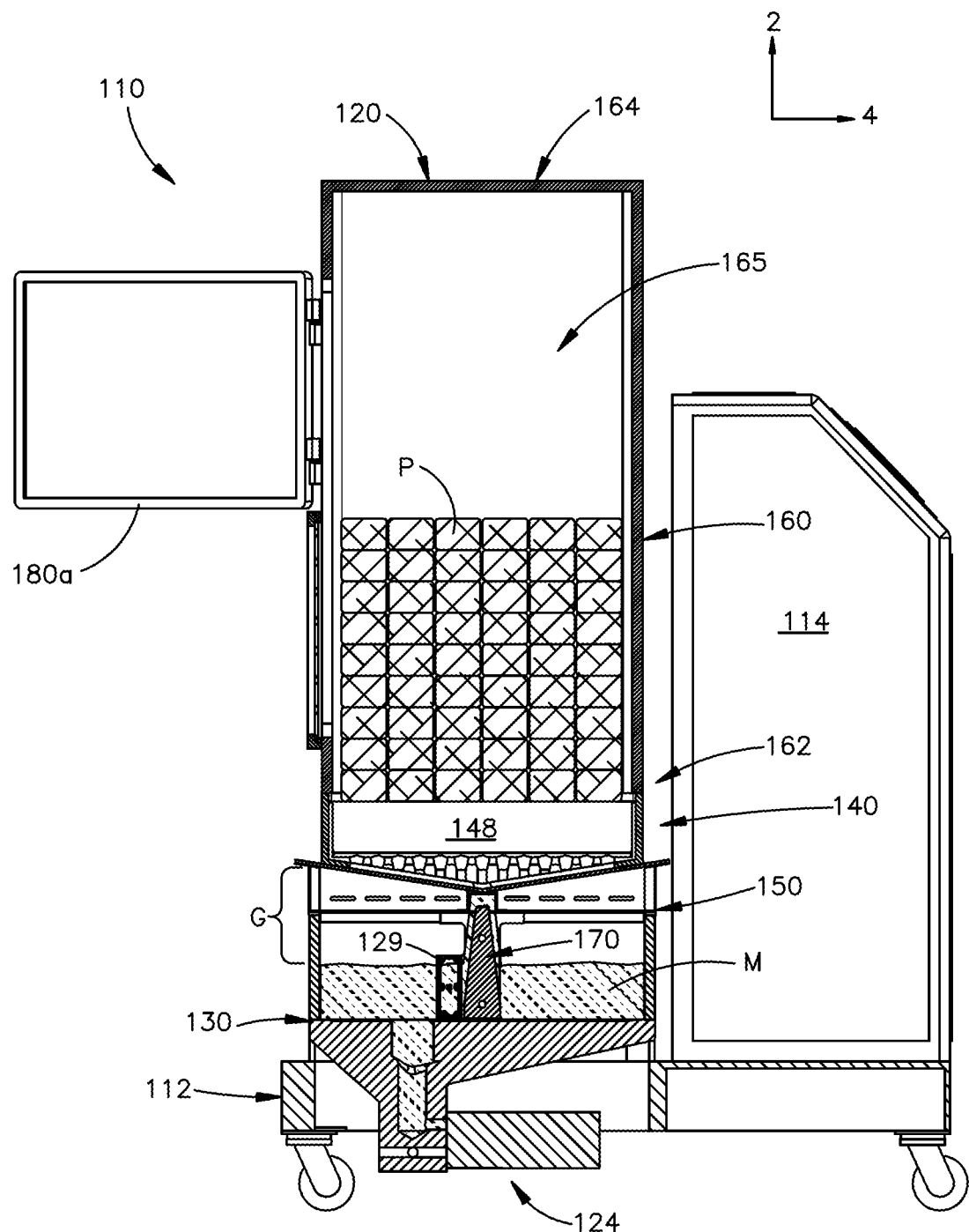
FIG. 6 is a cross-sectional view of a portion of the melt system taken along line 6-6 in FIG. 5.

Turning to FIGS. 5-6, the melting system 110 is configured to melt and deliver polymer material P downstream to dispensing equipment (not shown). The melt system 110 includes a base frame 112 mounted on wheels (not numbered), a control unit 114, and at least one melt unit 120. The control unit 114 includes a cabinet that houses controllers, displays, user interfaces, etc., an operator can use to control operation of the melt system 110. In accordance with the illustrated embodiment, the melt system 110 includes at least one melt unit 120. While only a single melt unit 120 is shown, the melt system 110 can include a plurality of melt units. As shown in FIGS. 5-6, the melt unit 120 is supported by the base frame 112 and the underlying surface and extends upwardly along a vertical direction 2. The melt unit 120 and control unit 114, and thus the base frame 112, define the overall footprint of the melt system 110.

Continuing with FIGS. 5 and 6, the melt unit 120 includes a pump assembly 124 proximate the base frame 112, a reservoir 130 coupled to the pump assembly 124, one or more sensors 29 (FIG. 6) positioned in the reservoir 130, a thermal isolation region 150, a melt grid 140 above the reservoir 130, and at least one hopper 160 mounted above the melt grid 140, the reservoir 130 captures the molten material M exiting the melt grid 140. A guide member 170 (FIG. 6) is positioned within the reservoir 130. The guide member 170 is configured to guide molten polymer M to a pool of molten liquid in the lower portion of the reservoir. The guide member 170 is typically partially submerged in molten polymer M during operation of the melt system 110 as will be described further below. The melt unit 120 also includes a control system 200 is used to control flow of molten polymer from the melt grid 140 and into the reservoir 130. The control system 100 for melt unit 120 operates in the same way to control the flow of molten polymer. The control system 100 includes a controller 102 coupled to the one or more sensors 129 and at least the melt grid 140.

Figure 7A:
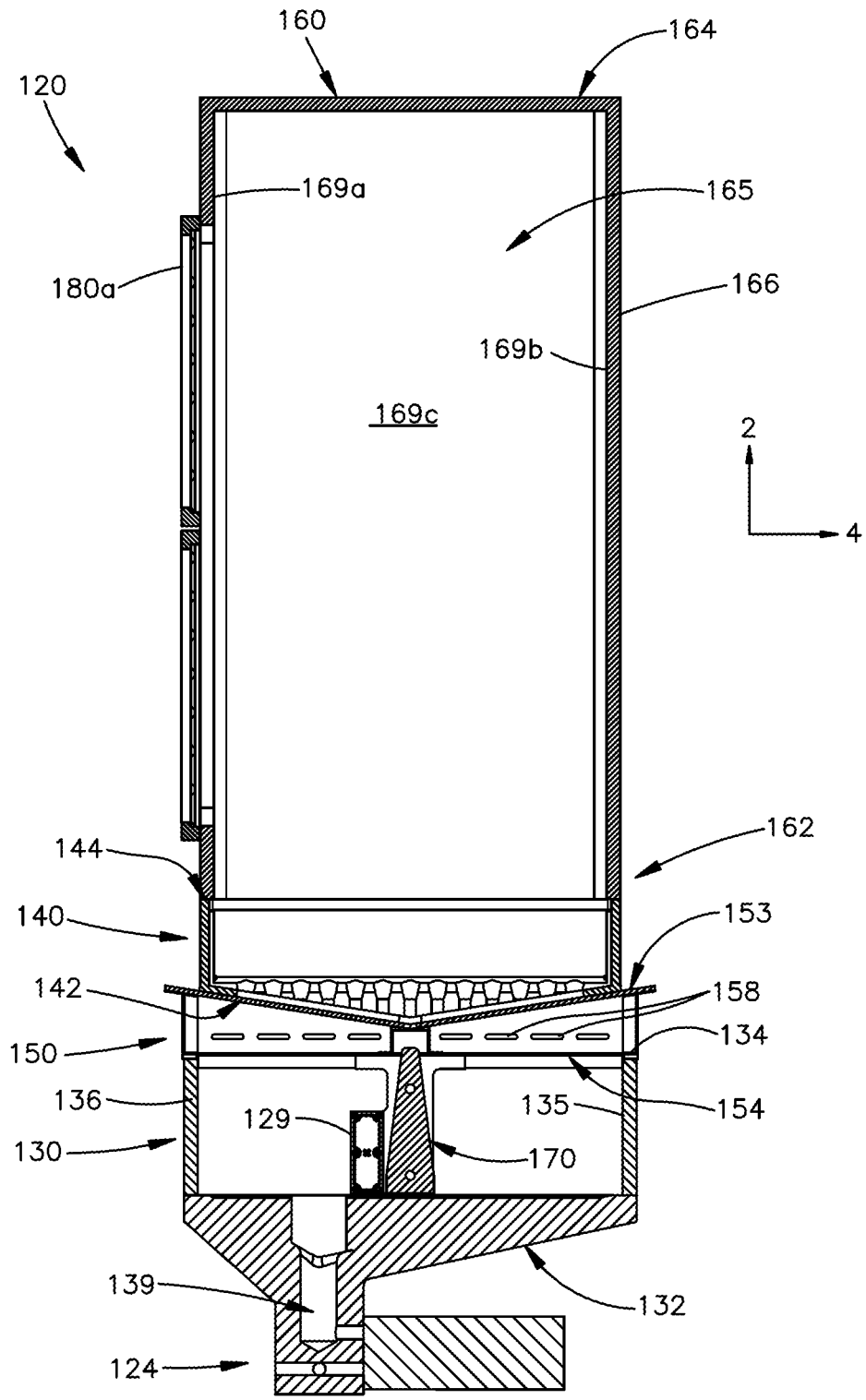
FIG. 7A is a cross-sectional view of the melt unit shown in FIG. 6 with the other components of the melt system removed for clarity.
Figure 7B:
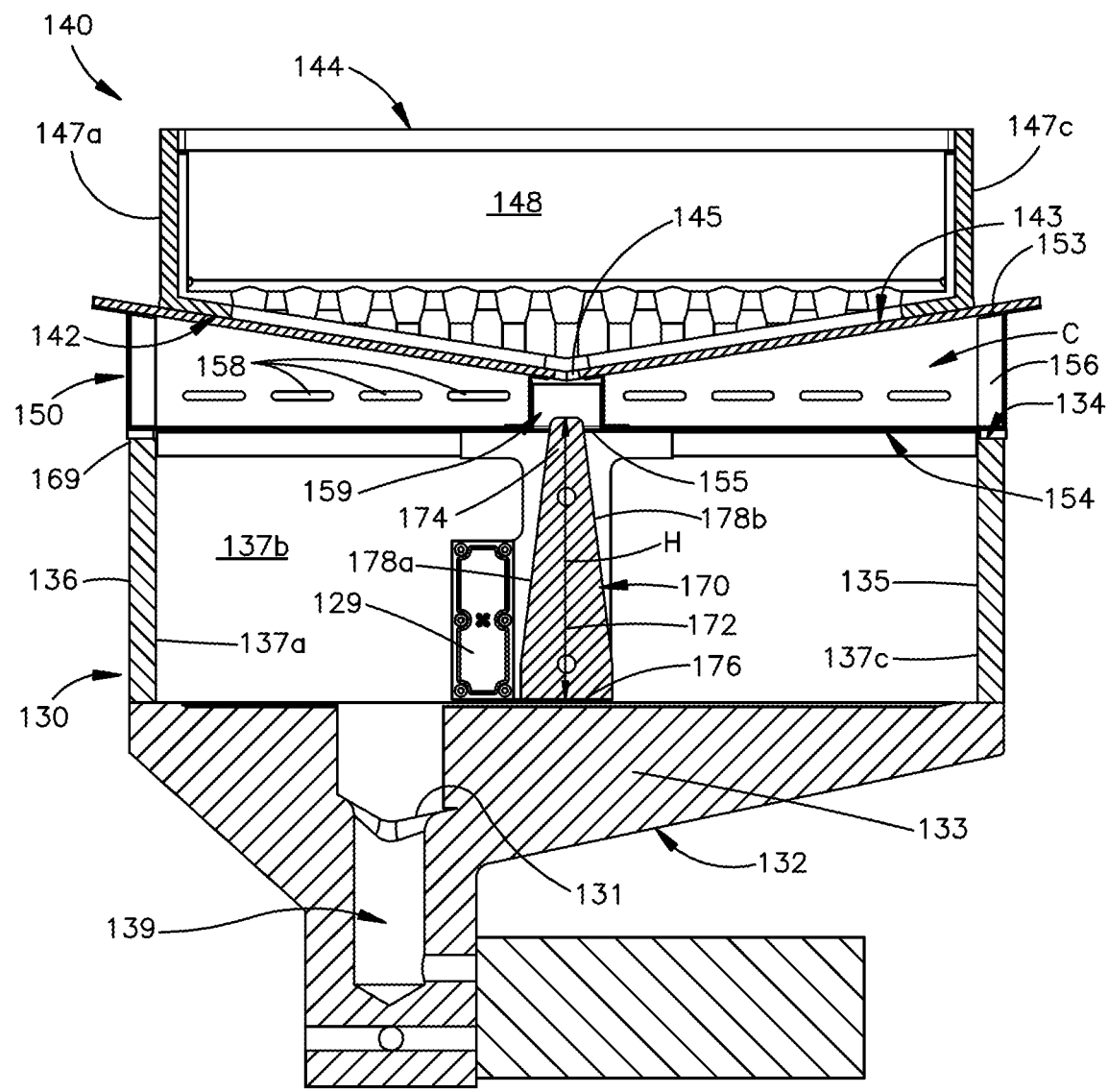
FIG. 7B is a cross-sectional view of a portion of the melt unit shown in FIG. 7A.

Turning to FIGS. 7A-7C, the reservoir 130 captures the molten material M exiting the melt grid 140. The reservoir 130 includes a base 132, a top 134 opposite the base 132 along a vertical direction 2, and an outer wall 136. The outer wall 136 includes four sides 137a, 137b, 137c and 137d (137d not shown). The outer wall 136 defines an inner surface 135 along which the sensor 129 may be positioned. As best shown in FIG. 7C, the interior of the base 132 has an inner surface 131 and a plurality of fins 133 spaced apart with respect to each other along the second lateral direction 6. The surface 131 feeds into a flow channel 139. The surface 131 and fins 133 guide the molten polymer M to the flow channel 139. The flow channel 139 is open to the pump assembly 124 and guides molten material M into the pump assembly 124 below the reservoir 130. As will be explained further below, the amount of molten polymer M that accumulates in the reservoir 130 is based, in part, on a) the throughput of polymer through the melt grid 140, b) the output of molten polymer from the reservoir 130, and c) the height of the reservoir 130.

Continuing with FIGS. 7A-7C, and in accordance with the illustrated embodiment, a thermal isolation chamber 150 is disposed below the melt grid 40. The thermal isolation region 150 comprises the upper portion of the reservoir as described above an illustrated in FIGS. 1-4. The thermal isolation chamber 150 creates an additional barrier between molten liquid in the reservoir 130 and the solid polymer material P in the hopper 160. The thermal isolation chamber 150 functions such that melt unit 120 can maintain the solid polymer material P in the hopper 160 at a first temperature that is lower than a second temperature of the molten polymer material M in the reservoir 130. As described above, the thermal isolation chamber 150 can be any space or structure that creates a thermal barrier to minimize thermal migration from the molten polymer in the reservoir to the solid polymer P in the hopper. The thermal isolation chamber 150 can define, at least in part, a gap G between the melt grid 40 and the molten liquid M, as shown in FIG. 6, and the thermal isolation chamber 150.

Continuing in with FIGS. 7A-7C, the thermal isolation chamber 150 may be positioned between the melt grid 140 and the reservoir 130. As shown, the thermal isolation chamber 150 includes an upper end 153, a lower wall 154, an outer wall 156 coupled to the lower wall 154, and an outlet 155 in the lower wall 154. The thermal isolation chamber 150 also includes a guide path 159 that is aligned with and proximate to the outlet 155. The guide path 159 extends between the discharge slot 145 and the outlet 155. The lower wall 154, outer wall 156 and bottom 142 of melt grid 140 together define an internal air cavity C. The thermal isolation chamber 150 also includes a plurality of vent holes 158 disposed along the outer wall 156. The vent holes 158 permit air to enter the internal cavity C and allow heat emanating from the molten pool in the reservoir to escape. Air external to the melt unit 120 can enter the vent holes 158 to regulate temperature within the air cavity C. The air cavity C thus serves as a thermal barrier between the melt grid 140 and reservoir 130, which in turn, helps maintain desired temperatures above melt grid 140, to maintain a solid polymer within the hopper, and below the thermal isolation chamber 150, to maintain molten liquid M. During a product stoppage, the melt grid 140 can be maintained at a temperature just below the melting temperature of the polymer to inhibit flow of the polymer in the reservoir 130. Furthermore, the reservoir can be temperature controlled to maintain the polymer within the reservoir in liquid form. Production can resume quickly by elevating the temperature of the melt grid 140, which initiates flow of the polymer into the reservoir 130.

Continuing with FIGS. 7A-7C, the melt grid 140 is configured to turn the solid polymer material P in the hopper 160 into the molten polymer material M. The melt grid includes a bottom 142 and a top 144 spaced from the bottom 142. The hopper 160 is coupled to the top 144 of the melt grid 140. The melt grid 140 has an outer wall 146 that includes four sides 147a, 147b, 147c and 147d (147d are not shown). The melt grid 140 may also include a plurality of parallel and spaced apart melting rails 148. The melting rails 148 extend across the melt grid 140 along the lateral direction 4. The melting rails 148 define passages 149 that extend between adjacent melting rails 48. Each melting rail 148 includes heating elements that elevates the temperature of the melting rails 148 to the desired temperature for the polymer material P being processed by the melt unit 20. The heating elements may be controlled by the control system.

As has been shown in FIG. 7B, the bottom 142 of the melt grid includes a plate 143 that guides polymer into the reservoir 130 to help prevent and/or minimize formation of air bubbles in the polymer flow. The plate 143 is angled toward its center to define a discharge slot 145. The discharge slot 145 is aligned with the guide path 159 and the guide member 170. As illustrated, the plate 143 as a V-shaped cross-sectional shape along a direction into the sheet of FIG. 7B. The plate 143 as shown conforms generally to the bottom of the each melting rail 148. Alternatively, the plate 143 can have other cross-sectional shapes and/or surface features that can be used to guide molten polymer toward the discharge slot 145. The plate 143 is shown is mounted to the outer portion of the top of the thermal isolation chamber 150. Each melting rail 148 is spaced apart from the plate 143 in order to create space for molten polymer M to pass through toward the discharge slot 145 of the plate 143 and into the guide path 159.

As illustrated in FIG. 7B, a guide member 170 is positioned in the reservoir 130 to receive molten polymer M from the melt grid 140. The guide member 170 includes a guide member body 172 that has a base 174, a top 176, and angled side walls 178a and 178b. The guide member 170 can be coupled to frame 171 (FIG. 7C), which is coupled to the reservoir 130. The guide member body 172 has a height H that extends from the base 174 to the top 176. The height is selected so that top 176 extends into, e.g. penetrates, the guide path 159 of the thermal isolation chamber 150. As shown, the top 176 is generally aligned along the vertical direction 2 with the outlet 155 of the thermal isolation chamber 150. The guide member 170 receives the molten material M and guides it into the pool of molten material in reservoir 130 below (FIG. 6). The guide member 170 can help minimize aeration and creation of air pockets in the molten material M as it exits the melt grid 140 and is collected in the reservoir 130.

Referring to FIGS. 6-7A, the hopper 160 is configured to hold polymer material P. As illustrated, the hopper 160 has a lower end 162, an upper end 164 opposite the lower end 162, and a wall 166 that extends from the lower end 162 to the upper end 164. The wall 166 includes four sides 169a, 169b, 169c and 169d (169d is not shown). Side 169a can be referred to as the front side or front of the hopper 160 and side 169c can be referred to as the back side or back of the hopper 160. In accordance with the illustrated embodiment, the sides 169a-169d are arranged to form a rectilinear cross-sectional shaped hopper. In accordance with an alternative embodiment, however, the hopper has a tubular shape and includes a wall 166 that defines a tubular shaped body. In such an embodiment, the hopper 160 includes a single curved wall. The upper end 164 includes an upper cover 168 that closes the upper end 164 of the hopper 160. The wall 166 and the upper cover 168 define an internal chamber 165 that holds the polymer material P. Because the hopper 160 may be side-loading as further describe below, the upper end 164 may be enclosed. This permits the hopper 160 to be installed in such a way that the upper end 164 extends closer to the ceiling than what would be possible with a typical top-loading hoppers. This results in increased polymer storage capacity over typical melt systems.

Referring to back to FIGS. 5 and 6, the hopper 160 has is configured to provide side access to the internal chamber 165. This is possible due in part to a "thermal valve" within the melt unit 120 created by complete engagement between the melt grid 140 and the semi-molten material. As polymers are suboptimal conductors of heat, the semi-molten material can block upward migration of heat from the melt grid 140 to the hopper 160. As shown, the hopper 160 includes one or more side access doors 180a, 180b that are configured to cover one or more access openings 70 (see FIG. 5). The side access doors 180a, 180b permit an operator to load polymer material P from the side of the hopper 160 instead of from the top. The side access doors 180a, 180b are substantially similar to the side access doors 80a, 80b described above. Thus, the one or more access doors 180a, 180b are movable between a closed position and an open position to provide access to the internal chamber 165. The hopper 160 may be configured to allow visualization of the polymer held in the hopper 160. As shown, the hopper 160 may also include one or more visualization windows 190a, 190b. The visualization windows 190a, 190b permit the operator to see inside the hopper 160 and observe the level of polymer material P in the hopper 160. The visualization windows 190a, 190b are substantially similar to the visualization windows 90a and 90b described above.

The hopper 160 has described and shown in FIGS. 5 and 6 is disposed on top of the melt grid 140 that is separated from the molten material in the reservoir 130 by the thermal isolation region 150. However, the hopper 160 as described herein can be used in melt systems with different types of melt grids and reservoir configurations than what is shown and described above.

Referring to FIGS. 6 and 7A, in operation is the same as the melt unit 20 and hopper described above. Specifically, the hopper 160 holds a supply of solid polymer material P on top of the melt grid 140. The heating cartridge in the melt grid 140 exposes the solid polymer material P positioned above the melt grid 140 to a temperature sufficient to form a molten polymer material M. The molten polymer material M flows through the melt grid 140 along the guide members 43 and is deposited into the plate 143. The molten polymer material M flows through the discharge slot 145 onto the guide member 170 and into the reservoir 130 to the pump assembly 124. The sensor 129 can determine the level of molten polymer M in the reservoir 130. The sensor 129 (one sensor is shown but more could be used) is communicatively coupled to the melt grid via the control system 100, 200 (FIG. 8). As the level of molten polymer M in the reservoir 130 decreases (as determined by the sensor 129), the control system 100, 200 causes the temperature of the melt grid 140 to increase to a desired temperature. This, in turn, increases the rate at which polymer is exiting the melt grid 140. If the level of molten polymer M in the reservoir 130 approaches a threshold level, the control system 100, 200 causes a decrease in the temperature of the melt grid 140. This, in turn, decreases the rate at which polymer exits the melt grid 140. The pump assembly 124 may continuously pump the molten material M from the reservoir 130 to the dispensing device (not shown). As molten material M is ejected, the supply of polymer material P in the hopper 160 is depleted. The supply of polymer material P may be observed through the visualization windows 190a, 90b (FIG. 2), when present, as described above.

While the disclosure is described herein using a limited number of embodiments, these specific embodiments are not intended to limit the scope of the disclosure as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A melt system configured to convert a solid adhesive into a molten adhesive, the melt system comprising:
   at least one melt unit having:
      a heated reservoir;

a melter configured to expose said solid adhesive to a temperature sufficient to form a molten adhesive, which is deposited into said heated reservoir; and a hopper disposed above said melter and configured to hold a supply of the solid adhesive, said hopper having a lower end, an upper end opposite said lower end, and a wall that extends from said lower end to said upper end, said lower end being proximate to and open to said melter, said upper end and said wall defining an internal chamber that holds said supply of said solid adhesive, said hopper further having an access door disposed on said wall, said access door moveable between a closed position where said hopper is closed and an open position where said internal chamber is accessible to receive said solid adhesive, wherein said hopper and said solid adhesive in said hopper are thermally isolated from said heated reservoir.

2. The melt system of claim 1, wherein the melter is positioned above said heated reservoir.

3. The melt system of claim 1, wherein said hopper includes an upper cover that encloses the upper end of said hopper.

4. The melt system of claim 1, wherein said hopper includes a visualization window configured to allow visualization of a level of said solid adhesive inside said internal chamber.

5. The melt system of claim 4, wherein said visualization window includes a transparent panel to allow visualization of said level of said solid adhesive inside said internal chamber.

6. The melt system of claim 4, wherein said access door includes said visualization window.

7. The melt system of claim 4, wherein said visualization window is separate from said access door.

8. The melt system of claim 4, wherein said visualization window is disposed on said wall.

9. The melt system of claim 4, wherein said wall includes a first wall and a second wall, said access door disposed on said first wall and said visualization window disposed on said second wall.

10. The melt system of claim 9, wherein said first wall intersects said second wall.

11. The melt system of claim 1, wherein said hopper includes a first hopper and a second hopper, said first hopper having a visualization window separate from said access door thereof and said second hopper having an access door including a visualization window.

12. The melt system of claim 1, wherein said access door includes a first access door and a second access door.

13. The melt system of claim 12, wherein an opening is defined in said wall of said hopper, said first access door and said second access door collectively covering said opening in said closed position.

14. The melt system of claim 12, wherein said first access door and said second access door are positioned with respect to each other along a vertical direction.

15. The melt system of claim 14, wherein said first access door and said second access door are independently moveable between said closed position and said open position.

16. The melt system of claim 1, wherein said access door is pivotable relative to said hopper between said closed position and said open position.

17. The melt system of claim 1, wherein said wall includes a plurality of walls arranged such that said hopper has a rectilinear cross-sectional shape.

18. The melt system of claim 1, wherein said wall is a curved wall such that said hopper has a tubular shape.

19. The melt system of claim 1, wherein said access door is slidable between said closed position and said open position.

20. The melt system of claim 1, wherein the upper end of said hopper is enclosed.

* * * * *